United States Patent [19]

Kenney et al.

[11] 4,119,585

[45] Oct. 10, 1978

[54] PROCESS FOR PREPARING RIGID POLYURETHANE FOAMS USING LATENT CATALYSTS

[75] Inventors: James F. Kenney, Mendham; Kenneth Treadwell, Rahway, both of N.J.

[73] Assignee: M&T Chemicals Inc., Stamford, Conn.

[21] Appl. No.: 795,496

[22] Filed: May 10, 1977

[51] Int. Cl.² .............................................. C08G 18/24
[52] U.S. Cl. .................................... 521/118; 521/121; 521/126; 521/175; 521/129
[58] Field of Search .................... 260/2.5 AC, 2.5 AB

[56] References Cited

U.S. PATENT DOCUMENTS

| 3,092,593 | 6/1963 | Nass | 260/2.5 AB |
| 3,095,434 | 6/1963 | Stamm | 260/2.5 AB |
| 3,432,474 | 3/1969 | Lombardi | 260/2.5 AC |
| 3,635,906 | 1/1972 | Jayawant | 252/431 R |
| 3,645,927 | 2/1972 | Andres | 260/2.5 AB |
| 3,933,692 | 1/1976 | Kushlefsky | 260/2.5 AC |
| 3,980,579 | 9/1976 | Syrop | 260/2.5 AC |

FOREIGN PATENT DOCUMENTS 1,006,630  10/1965  United Kingdom .............. 260/2.5 AB Primary Examiner—C. Warren Ivy
Attorney, Agent, or Firm—Kenneth G. Wheeless; Robert Spector

[57] ABSTRACT

The combination of a diorganotin sulfide, -polysulfide, -dithiocyanate, bis(thiocyanato diorganotin) sulfide or bis(thiocyanato diorganotin) oxide with a tertiary amine functions as a latent catalyst for rigid polyurethane foams. Latency is not observed using a tertiary amine with other sulfur-containing organotin compounds.

13 Claims, No Drawings

PROCESS FOR PREPARING RIGID POLYURETHANE FOAMS USING LATENT CATALYSTS

BACKGROUND OF THE INVENTION

This invention relates to the preparation of rigid polyurethane foams. This invention further relates to the preparation of rigid polyurethane foams using certain diorganotin compounds in combination with a tertiary amine as gel catalysts for the purpose of delaying initiation of the polymerization reaction. This delay is advantageous in many enduse applications.

Rigid polyurethane foams can be prepared using a variety of well known methods. In some instances it is desirable to prepare the foam at the location where it will be employed. Rigid polyurethane foams may be applied to the outside surface of a storage tank to provide insulation, to the roof of a building or between the inner and outer walls of a building. The urethane foam can be applied by spray. The sprayed-in-place polyurethane foam is economically attractive because of the ease of application by spray. For these applications it is most preferred to employ a two-component system, one of which is a polyfunctional isocyanate such as polymethylene polyphenyl isocyanate. The second component contains the polyol, gel catalyst and blowing agent together with any modifiers or additives. A surfactant such as a siloxane polymer is usually included to achieve a uniform cell structure in the final foam. The second component is often employed as a pre-packaged mixture that is prepared weeks or even months before it is reacted with the isocyanate.

Organotin compounds are typically very active catalysts for the reaction of isocyanates with polyols. Often the reaction is so rapid that the liquid formulation employed to prepare the foam becomes too viscous to flow into every part of the mold or other container into which it is poured. When incomplete filling of the mold occurs, the shape of the final foam does not coincide with that of the mold or other container in which it is formed, and the foam article must therefore often be rejected. The value of rigid urethane foam as an insulating material is considerably reduced if the foam does not completely fill the space between the inner and outer walls of a building or of a container employed to maintain the temperature of a solid or liquid that is stored therein by inhibiting heat transfer.

An objective of this invention is to delay the cream time of rigid polyurethane foams prepared using the combination of a tetravalent organotin compound and a tertiary amine as the gel catalyst. Surprisingly it has now been found that this objective can be achieved using certain sulfur-containing diorganotin compounds as one component of the gel catalyst.

SUMMARY OF THE INVENTION

This invention provides a method for lengthening the cream time during the preparation of rigid cellular polyurethanes by reacting a polyol containing at least two active hydrogen atoms per molecule, as determined by the Zerewitinoff method, with a polyfunctional isocyanate, the reaction being conducted in the presence of a blowing agent, a surfactant and an effective amount of a latent gel catalyst consisting essentially of a diorganotin compound represented by a formula selected from the group consisting of $R^1R^2SnS_x$, $R^1R^2Sn(SCN)_2$, $(R^1R^2SnSCN)_2S_x$ and $(R^1R^2SnSCN)_2O$ and a tertiary amine of the formula $R^3R^4R^5N$ or a heterocyclic tertiary amine, wherein $R^1$ and $R^2$ are individually selected from the group consisting of alkyl containing from 1 to 20 carbon atoms, cycloalkyl, aryl, aralkyl and alkaryl, $R^3$, $R^4$ and $R^5$ are individually selected from the group consisting of alkyl containing from 1 to 20 carbon atoms, hydroxyalkyl containing from 2 to 4 carbon atoms, cycloalkyl, aryl, aralkyl and alkaryl, and x is an integer from 1 to 4 and wherein the concentration of said diorganotin compound is from 0.1 to 10 parts by weight per 100 parts of said polyol and the concentration of said tertiary amine or heterocyclic tertiary amine is from 0.1 to 4 parts by weight per 100 parts of polyol.

DETAILED DESCRIPTION OF THE INVENTION

The diorganotin compound that constitutes one component of the present catalysts is a diorganotin sulfide, -dithiocyanate, bis(thiocyanato diorganotin) sulfide or a bis(thiocyanato diorganotin) oxide.

The two hydrocarbon groups of the present diorganotin compounds, represented by $R^1$ and $R^2$ in the foregoing formula, can be alkyl containing from 1 to 20 carbon atoms, cycloalkyl, aryl (particularly phenyl), aralkyl or alkaryl. The alkyl portions of the aralkyl and alkaryl groups contain from 1 to 12 carbon atoms and the aryl portion, an aromatic hydrocarbon, is preferably phenyl. Since the most readily available organotin compounds are those wherein $R^1$ and $R^2$ of the preceding formulae are both methyl, butyl, octyl or phenyl, these compounds would be preferred for use in the precursors of this invention. It should be understood that $R^1$ and $R^2$ can be identical or different.

The optimum concentration of the diorganotin component of the present catalysts will be determined by a number of factors including reactivity of the polyol and isocyanate and the desired cream and rise times. Conventionally this concentration is from 0.1 to 10 parts by weight per 100 parts of polyol, preferably from 0.1 to 5.0 parts.

The diorganotin compound is employed in combination with those tertiary amines conventionally used as gel catalysts in rigid foam formulations. Suitable amines include dimethylethanolamine, N-ethyl morpholine and triethylene diamine. The concentration of amine is preferably from 0.1 to 4 parts by weight per 100 parts of polyol. As previously disclosed the tertiary amine component can contain three monovalent hydrocarbon groups bonded to a nitrogen atom. These hydrocarbon groups are represented by $R^3$, $R^4$ and $R^5$ in the foregoing formula. Alternatively, two of the carbon atoms bonded to the nitrogen atom can be part of the same divalent hydrocarbon group such that the resultant ring contains 5 or 6 atoms, one of which is the nitrogen atom. The ring may also contain one another heteroatom such as oxygen, nitrogen or sulfur. Optionally one or more double bonds can be present in the ring, as would be true for compounds such as pyridine. N-ethyl morpholine, a tertiary amine, contains a 6 membered ring made up of 4 carbon atoms, an oxygen atom and a nitrogen atom. In this instance the ring does not contain any unsaturated sites.

Tertiary amines conventionally employed as catalysts for preparing rigid polyurethane foams include triethylamine, dimethylethanolamine, bis(dimethylaminoethyl) ether, tetramethylbutanediamine, tetramethylethylenediamine, dimethylpiperazine, trimethylaminoethylpiperazine, N-methyldicyclohexylamine, N- cyclohexylmorpholine, N-(2-hydroxyethyl)cyclohexylamine, N-(2-cyanoethyl)cyclohexylamine, N-(3-aminopropyl) cyclohexylamine and N-phenylcyclohexylamine.

In addition to the polyol, one of the present diorganotin compounds and a tertiary amine, the precursor often contains a surfactant and a blowing agent which boils or decomposes at the elevated temperatures produced during the polyol-isocyanate reaction to yield a gaseous product which forms bubbles that are entrapped within the reacting polyolisocyanate mixture. Among the preferred blowing agents are those chlorine-containing fluorocarbons boiling from 35 to about 90° C. The surfactant is preferably a siloxane-alkylene oxide copolymer and is present in an amount of from 1 to about 5 parts by weight per 100 parts of polyol.

The present latent gel catalysts are suitable for use with substantially all of the known polyalkylene polyols and polyfunctional isocyanates conventionally employed to prepare rigid polyurethane foams. Suitable polyalkylene polyols are liquids which typically exhibit an average molecular weight of between 500 and 5000 and include hydroxyl-containing polyethers, polyesters and polyamides, alkylene glycols, polymercaptans and polyamines. These polyalkylene polyols exhibit either primary or secondary active hydroxyl groups. The class of hydroxyl-containing polyethers or polyesters includes fatty acid glycerides having hydroxyl numbers between 50 and 75, such as castor oil, hydrogenated castor oil and "blown" natural oils.

Hydroxyl-terminated polyethers, a preferred type of polyalkylene polyol, include polyalkylene glycols, e.g. polyethylene glycols and polypropylene glycols. The molecular weight of these compounds is preferably between about 200 and 5000.

A type of polyether that is particularly preferred for rigid polyurethane foams is obtained by polymerizing propylene oxide in the presence of sucrose or other compound containing at least three hydroxyl groups. The resultant product exhibits the polyfunctionality required to achieve the crosslinking characteristic of rigid polyurethane foams.

Hydroxyl-terminated polyesters, a second type of polyalkylene polyol, can be obtained by the esterificationcondensation reaction of aliphatic dibasic carboxylic acids with glycols, triols or mixtures thereof, in proportions such that most or all of the resultant polymer chains contain terminal hydroxyl groups. Dibasic carboxylic acids suitable for preparing polyesters include aliphatic and aromatic acids such as adipic, fumaric, sebacic and the isomeric phthalic acids. The acid is reacted with a polyhydroxylated compound such as ethylene glycol, diethylene glycol or trimethylol propane, among others.

The polyfunctional isocyanates used to prepare rigid polyurethane foams include both polyisocyanates and polyisothiocyanates. While the invention is described with specific reference to the reaction of certain polyfunctional isocyanates, it is generically applicable to the reaction of any compound containing more than two —N=C=G radicals wherein G is oxygen or sulfur. Compounds within this generic definition include polyisocyanates and polyisothiocyanates of the formula R(NCG)$_x$ in which the average value of x is greater than 2, preferably from 2.1 to 3.0. R can be alkylene, substituted alkylene, arylene, substituted arylene or other polyvalent hydrocarbon radical that may optionally contain one or more aryl-NCG bonds and one or more alkyl-NCG bonds.

Suitable isocyanates include the polyfunctional byproducts obtained during the preparation of the isomeric tolylene dissocyanates. Polymethylene polyphenyl isocyanate is an example of such a by-product. Triisocyanates obtained by reacting 3 moles of an arylene diisocyanate for each mole of a triol, e.g. the products formed from 3 moles of tolylene diisocyanate and 1 mole of hexane triol are also suitable.

Oligomeric and polymeric isocyanates of the general formula (RNCG)$_x$ and [R(NCG)$_x$]$_y$ in which x and y are from 2.1 to 10, are also useful, as are the compounds of the general formula M(NCG)$_x$ wherein x is more than 2 and M is a difunctional or polyfunctional atom or group.

The amount of isocyanate used in usually in excess of the stoichiometric amount required to react with the active hydrogens supplied by the polyol and any water present, thereby forming

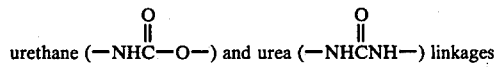

in the polymer chains. Depending upon the desired density of the urethane foam and the amount of crosslinking desired, the ratio of isocyanate equivalents to the equivalents of active hydrogen should be 0.8 to 1.2, respectively, and preferably between 0.9 and 1.1.

A precursor containing all of the components other than the isocyanate is desirable for rigid foams that are prepared at the location where the foam is to be installed. This is often at a construction site where there are often no facilities for measuring and uniformly blending the various components of the precursor. Premeasured amounts of the precursor and polyfunctional isocyanate are combined just prior to formation of the foam. Depending upon the particular end use, the resultant mixture is sprayed onto a surface or poured into a cavity and allowed to react, forming a rigid foam.

The accompanying examples demonstrate the latency that characterizes the present catalysts and compares their activity with that of conventional organotin catalysts using the same amine co-catalyst. The examples are representative of the various sulfur-containing diorganotin compounds encompassed by the accompanying claims, and therefore should not be interpreted as limiting the scope of this invention. All parts and percentages disclosed are by weight unless otherwise specified.

The time interval between combining of the polyfunctional isocyanate with the other materials employed to prepare the foam and the initiation of the polymerization reaction is referred to as the cream time. Initiation of the polymerization reaction is accompanied by an increase in the viscosity of the reaction mixture and a transformation from an initially clear reaction mixture to an opaque one. The time interval between combining of all the reagents and the completion of the foaming reaction is referred to as the rise time.

EXAMPLE 1

A precursor or masterbatch for a rigid polyurethane foam was prepared by combining the polyol, surfactant and a blowing agent in the indicated proportions. The polyol is a sorbitol-based propylene oxide-ethylene oxide copolymer exhibiting a hydroxyl number of 490 and a viscosity of 8700±100 centipois at 25° C. The polyol is available as LS-490 from the Union Carbide Chemical Corporation. The surfactant is a siloxane-oxyethylene-oxypropylene copolymer available as L-5340 from the Union Carbide Chemical Corporation.

| Precursor Component | Parts by Weight |
|---|---|
| Polyol | 100 |
| Surfactant | 1.5 |
| Trichlorofluoromethane | 30 |

32.8 parts of this precursor were combined with 30.5 parts of polymethylene polyphenyl isocyanate exhibiting an isocyanate equivalent of about 133, 0.3 part of water, 0.15 part of dimethylethanolamine and 0.1 part of the organotin catalyst to be evaluated. The resultant mixture was stirred for several seconds, then poured into a suitable container and allowed to rise. The catalysts evaluated, together with the cream and rise time of each formulation, are set forth in the following table.

| Organotin Compound (0.1 part) | Cream Time (seconds) | Rise Time (seconds) |
|---|---|---|
| Dibutyltin sulfide | 78 | 156 |
| Dibutyltin dithiocyanate | 49 | 117 |
| Bis(thiocyanato dibutyltin) oxide | 48 | 109 |
| Bis(thiocyanato dibutyltin) sulfide | 54 | 118 |
| Controls | | |
| Dibutyltin dilaurate | 40 | 120 |
| Dibutyltin-S, S'-bis-(isooctyl mercaptoacetate) | 39 | 108 |
| Dibutyltin bis(lauryl mercaptide) | 35 | 113 |

The data in the foregoing table demonstrate the uniqueness of the present diorganotin catalysts with regard to latency of activity for rigid polyurethane foams. The three control catalysts exhibited substantially shorter cream times. It should be noted that of the controls, those containing tin-sulfur bonds were the most reactive, as determined by the shorter times required for initiation of the polymerization.

EXAMPLE 2

This example deomonstrates the latency exhibited by the present catalyst systems using commercial scale equipment for preparing rigid polyurethane foams.

Precursors of the composition disclosed in Example 1 in an amount of 32.8 parts were combined with 30.5 parts polymethylene polyphenyl isocyanate and dispensed into containers using a Martin-Sweets foam machine. This equipment is representative of the type employed to prepare foams for insulating buildings, tanks and similar large structures wherein it is desired to maintain a controlled temperature. The cream and rise time exhibited by formulations containing two of the present diorganotin catalysts and two prior art catalysts are set forth in the following table.

| Organotin Compound (0.1 part) | Cream Time (seconds) | Rise Time (seconds) |
|---|---|---|
| Dibutyltin sulfide | 48 | 116 |
| Dibutyltin dithiocyanate | 45 | 95 |
| Controls | | |
| Dibutyltin bis(lauryl mercaptide) | 30 | 92 |
| Dibutyltin-S,S'-bis-(isooctyl mercaptoacetate) | 37 | 95 |

The foregoing data demonstrate a 20 to 60% increase in cream time using the present diorganotin compounds relative to prior art organotin catalysts. The additional time is desirable, since it improves the likelihood that all portions of the mold or other form into which the formulation is poured, injected or sprayed will be completely filled prior to the inhibition of flow due to a rapid increase in viscosity that accompanies the polymerization reaction. A relatively small increase in the time allowed for filling the mold can avoid the loss of time, energy and materials incurred when a product must be rejected as a result of failure of the foam to completely fill the mold.

It should be noted that while the cream times obtained using the present diorganotin compounds in combination with tertiary amines are considerably longer relative to prior art catalysts, in many instances the rise times are equivalent. This represents a considerable advantage for a continuous foam-making operation. An important objective in such a process is to minimize the time interval between combining of the reagents and removal of the final foam from the mold or conveyor where it is formed.

What is claimed is:

1. In an improved method for preparing a rigid polyurethane foam by reacting a polyol containing at least two active hydrogen atoms, as determined by the Zerewitinoff method, with a polyfunctional isocyanate, the reaction being conducted in the presence of a blowing agent, a surfactant and a catalyst, the improved which resides in increasing the time interval between the combining of said polyol with said isocyanate and the initiation of said reaction by employing a latent catalyst consisting essentially of a mixture containing 1) a diorganotin compound represented by a formula selected from the group consisting of $R^1R^2SnS_x$, $R^1R^2Sn(SCN)_2$, $(R^1R^2SnSCN)_2S_x$ and $(R^1R^2SnSCN)_2O$ and 2) an amine selected from the group consisting of tertiary amines of the formula $R^3R^4R^5N$ wherein $R^1$ and $R^2$ are individually selected from the group consisting of alkyl containing from 1 to 20 carbon atoms, cycloalkyl, aryl, aralkyl and alkaryl, $R^3$, $R^4$ and $R^5$ are individually selected from the group consisting of alkyl containing from 1 to 20 carbon atoms, hydroxyalkyl containing from 2 to 4 carbon atoms, cycloalkyl, aryl, aralkyl and alkaryl, alternatively two of the carbon atoms of the $R^3$, $R^4$ or $R^5$ groups bonded to the nitrogen atom can be part of the same divalent hydrocarbon group such that the resultant ring contains 5 or 6 atoms one of which is the nitrogen atom and wherein the resultant heterocyclic ring can also contain one additional heteroatom such as oxygen, nitrogen or sulfur; and $x$ is an interger from 1 to 4, and wherein the concentration of said diorganotin compound is from 0.1 to 10 parts by weight per 100 parts of said polyol and the concentration of said tertiary amine or heterocyclic tertiary amine is from 0.1 to 4 parts by weight per 100 parts of polyol.

2. An improved method according to claim 1 wherein $R^1$ and $R^2$ are alkyl.

3. An improved method according to claim 2 wherein said diorganotin compound is a dialkyltin sulfide.

4. An improved method according to claim 2 wherein said diorganotin compound is a dialkyltin dithiocyanate.

5. An improved method according to claim 2 wherein said diorganotin compound is a bis(thiocyanato dialkyltin) sulfide.

6. An improved method according to claim 2 wherein said diorganotin compound is a bis(thiocyanato dialkyltin) oxide.

7. An improved method according to claim 2 wherein $R^1$ and $R^2$ are butyl.

8. An improved method according to claim 1 wherein said diorganotin compound is dibutyltin sulfide.

9. An improved method according to claim 1 wherein said diorganotin compound is dibutyltin dithiocyanate.

10. An improved method according to claim 1 wherein said diorganotin compound is bis(thiocyanato dibutyltin) sulfide.

11. An improved method according to claim 1 wherein said diorganotin compound is bis(thiocyanato dibutyltin) oxide.

12. An improved method according to claim 1 wherein $R^3$ and $R^4$ are alkyl and $R^5$ is hydroxyalkyl.

13. An improved method according to claim 1 wherein the tertiary amine is dimethylethanolamine.

* * * * *

UNITED STATES PATENT OFFICE
CERTIFICATE OF CORRECTION

Patent No. 4,119,585   Dated October 10, 1978

Inventor(s) JAMES F. KENNEY ET AL.

It is certified that error appears in the above-identified patent and that said Letters Patent are hereby corrected as shown below:

Claim 1, line 6 - Delete "improved" and substitute therefor --improvement--.

Claim 1, line 28 - Delete "interger" and substitute therefor --integer--.

Signed and Sealed this

Sixth Day of March 1979

[SEAL]

Attest:

RUTH C. MASON
Attesting Officer

DONALD W. BANNER
Commissioner of Patents and Trademarks